United States Patent Office 3,239,537
Patented Mar. 8, 1966

3,239,537
DIPHENYLMETHANE-BIS-TRIMELLITATE ANHYDRIDES
Robert Steckler, Russel, Ohio, and Siegfried Altscher, Union, N.J., assignors to Nopco Chemical Company, Newark, N.J., a corporation of New Jersey
No Drawing. Filed Aug. 18, 1960, Ser. No. 50,320
7 Claims. (Cl. 260—346.3)

This invention relates to novel solid non-volatile aromatic dianhydride compositions which posses excellent solubility in common solvents. More specifically, this invention relates to pyromellitic dianhydride condensates which possess excellent solubility in common solvents.

The use of anhydrides as cross-linking or curing agents for epoxy resins is well known. Phthalic, tertrahydro phthalic, chloroendic, maleic and other anhydrides are widely used. The cured resins especially those cured with the ring anhydrides are characterized by good electrical properties and high heat distortion temperatures. Recently, pyromellitic dianhydride (PMDA) has come into use as a cross-linking agent. It is far superior to the older mono-anhydrides because of its high reactivity and non-volatility and because it gives cured resins of the highest heat distortion temperatures realizable with epoxy resins. However the use of pyromellitic dianhydride is severely restricted because it has little or no solubility in the resins and solvents with which it is used. Moreover, its extremely high melting point, viz., 268° C., precludes the possibility of fusion to promote compatibility. The present state of the art as it applies to pyromellitic dianhydride is well summarized by Dr. Skeist in his book, "Epoxy Resins," Rheinhold (1958). On page 52, he states ". . . pyromellitic dianhydride is not easy to use, but for high temperature applications its results are worth the trouble."

It is, therefore, an object of this invention to obtain a solid non-volatile aromatic dianhydride composition which is soluble in polar and non-polar solvents.

It is a further object of this invention to obtain solvent soluble non-volatile solid aromatic dianhydrides which are highly reactive and are especially useful as curing agents.

Other objects of this invention will be obvious and will in part appear hereinafter.

We have discovered that when pyromellitic dianhydride is condensed with a unique class of aromatic based glycols, the resulting condensate overcomes the shortcomings present when pyromellitic dianhydride is used as a curing agent. This condensate is an outstanding curing and cross-linking agent characterized by high reactivity, non-volatility and being readily fusible and quite soluble in common solvents. The aromatic based glycols used in the preparation of the pyromellitic dianhydride condensates have the following structure

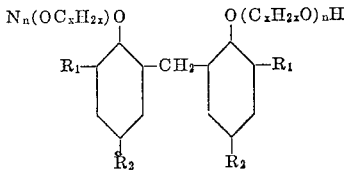

wherein $R_1$ is H or $CH_3$
$R_2$ is a straight, branched or carbocyclic alkyl substituent having from about 5 to 12 carbon atoms
$n$ is an average number varying from 1 to 3
$x$ is a whole number varying from 2 to 4

These glycols as can be seen contain an aromatic core. Condensates of pyromellitic dianhydride with these are far superior to condensates with aliphatic glycols since aliphatic glycols give much softer cured resins. The glycols we use are derived from an alkylated phenol novolak which is essentially a bis-phenol. This is highly advantageous since too much poly-functionality leads to gelling in the condensation with pyromellitic dianhydride. Also, the aromatic ring or core is alkylated. Otherwise the product, such as in the case of one based upon bisphenol A, is little improved regarding its solubility over pyromellitic dianhydride per se.

In preparing our novel condensates, the aromatic based glycol and pyromellitic dianhydride are preferably refluxed together in an inert solvent for a period of time sufficient to allow the mixture to become homogeneous and clear. Usually, this requires refluxing for about 4 to 5 hours. The resulting solution can be used as obtained, or the solvent can be removed by distillation, preferably under reduced pressure, e.g., about 30 to 55 mm., wherein tan colored brittle solids are obtained. These solids can be ground readily to a fine, free-flowing non-caking powder. Analysis of these solids indicates an anhydride to carboxyl mol ratio of about one to one which corresponds to that predicted by theory. The overall chemical reaction can be shown as follows:

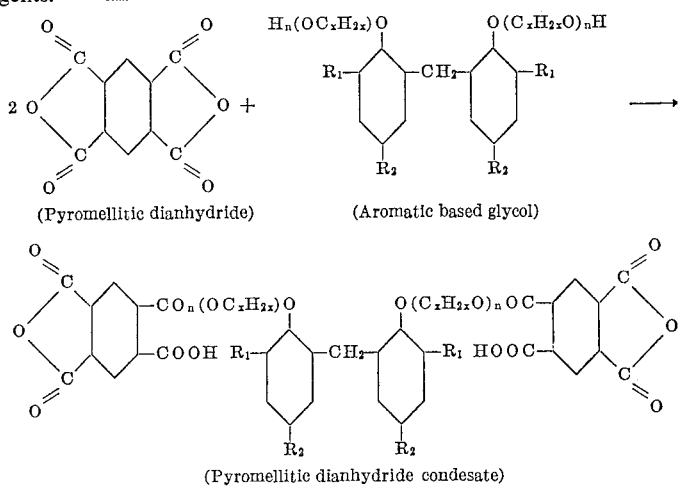

wherein $R_1$ is hydrogen or methyl;
$R_2$ is a straight, branched or carbocyclic alkyl substituent having from about 5 to 12 carbon atoms
$n$ is an average number varying from 1 to 3
$x$ is a whole number varying from 2 to 4

In carrying out the above reaction, two mols of pyromellitic dianhydride are reacted with one mol of the aromatic based glycol. However, when the quantity of the aromatic based glycol is increased, i.e., when amounts of the aromatic glycol increasing from 1.0 to 1.2 mols are reacted with two mols of pyromellitic dianhydride, a mixture of adducts results whose average composition is shown by the following:

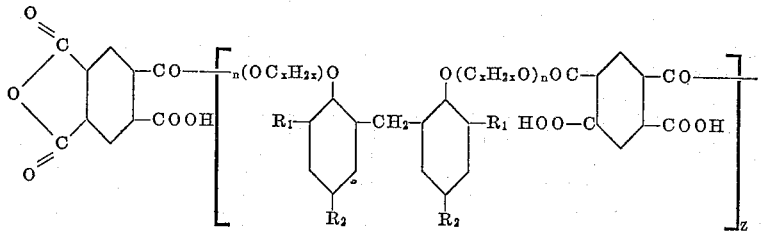

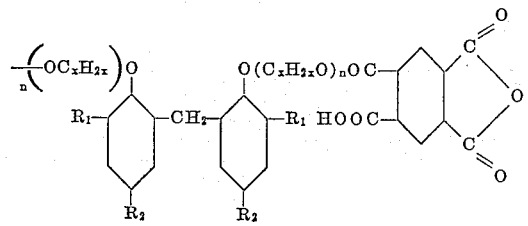

wherein z is an average number increasing from 0 as shown by the following:

$$z = 0 \text{ when } \frac{\text{moles glycol}}{\text{moles PMDA}} = \frac{1}{2}$$

$$z = 0.22 \text{ when } \frac{\text{moles glycol}}{\text{moles PMDA}} = \frac{1.1}{2}$$

$$z = 0.50 \text{ when } \frac{\text{moles glycol}}{\text{moles PMDA}} = \frac{1.2}{2}$$

and wherein $R_1$, $R_2$, $n$ and $x$ are the same as previously indicated.

The aromatic based glycols can be prepared as follows. First, a bis-phenol is prepared by reacting from about 1.67 to 2.00 mols of a para-substituted alkyl phenol or a para-substituted alkyl ortho-cresol with one mol of formaldehyde or equivalent amounts of paraformaldehyde, trioxane, etc., which liberate formaldehyde in the presence of acid catalysts such as hydrochloric and sulfuric acids. Suitable para-substituted phenols are p-amyl phenol, p-tertiary amyl phenol, p-hexyl phenol, p-cyclohexyl phenol, p-octyl phenol, p-tertiary octyl phenol, p-decyl phenol, p-dodecyl phenol and corresponding para-substituted o-cresols such as o-methyl, p-amyl phenol; o-methyl, p-octyl phenol, etc. Condensation temperatures of from 65° to 105° C. are maintained for about 2 to 6 hours. The resulting product is essentially a bis-phenol of the formula

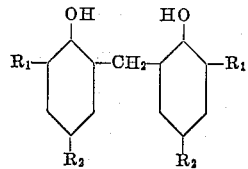

wherein $R_1$ is hydorgen or a methyl group and $R_2$ is a straight, branched or carbocyclic alkyl substituent having from about 5 to 12 carbon atoms. The resulting bis-phenol is thereafter reacted with a lower alkylene oxide such as ethylene oxide, propylene oxide or butyene oxide in amounts to provide for an average of from about 1 to 3 mols, preferably 1.1 to 1.5 mols of lower alkylene oxide per phenolic hydroxyl group. The alkylene oxide addition is carried out by reacting the bis-phenol with the alkylene oxide at about 150° to 200° C., optionally under pressure, e.g., 25 p.s.i., in the presence of about 0.1 percent by weight alkali hydroxide or alkali metal carbonate as the catalyst. It should be understood that the foregoing preparation of the aromatic based glycol is merely exemplary and the present invention is not limited to the method of preparing this material.

The products of our invention are solid dianhydride condensates with well defined melting ranges varying from 90° C. to 140° C. and containing 6.5 percent to 15 percent by weight of anhydride groups depending on the mol ratios of reactants employed. The anhydride end groups will form as long as there is an excess over one mol of the aromatic based glycol per mol of the dianhydride.

The condensates or adducts obtained as indicated above have improved solubility in common solvents especially non-polar solvents. This improved solubility permits the use of less expensive solvents in coating systems employing solutions of these adducts. Thus they have been found to be soluble in common solvents such as aliphatic esters, ketones, aromatic hydrocarbons, nitroparaffins, chlorinated hydrocarbons and their mixtures. Specific examples of these solvents include ethyl acetate, ethylene glycol mono-ethyl ether acetate, acetone, methyl ethyl ketone, methyl iso-butyl ketone, benzene, toluene, xylene, nitro-methane, nitro-ethane, 1-nitro-propane, 2-nitro-propane, chloroform and carbon tetrachloride. When it is desired to use our adducts with solvents, any solvent can be used in which the adduct is soluble at the desired concentration with the exception of alcohols or compounds containing groups which are reactive with the anhydride group of the adduct.

Another desirable feature of our invention is that the adducts thus formed have a lower and well defined melting range. This unique property of a lower and well defined melting range together with high reactivity and non-volatility makes these pyromellitic dianhydride adducts useful as cross-linking or curing agents for epoxy resins in solvent free coating systems employing finely divided solid components. These finely divided solid components are commonly referred to as "fluidized bed coatings." Thus, when these adducts are used in solvent-free fluidized-bed systems of coatings, the lower melting range of the adducts permits the use of lower cladding temperatures, i.e., temperatures to which the object to be coated must be heated prior to insertion into the fluidized bed. This is of especial advantage where large objects are to be coated since lower cladding temperatures result in considerable reduction in preheating times. Such lower operating temperatures enchance chemical stability of the bed and also bring about a reduction in expense.

Moreover, the unique structure of the aromatic based glycol contributes to the overall physical and chemical properties of the cross-linked polymeric structure cured with our condensates such as enhancing its flexibility, impact resistance, adhesion, hardness and resistance to organic solvents, acids and bases. In contradistinction to this, adducts prepared from pyromellitic dianhydride and aliphatic glycols such as ethylene glycol, polyethylene glycols, propylene glycols, or polypropylene glycols are soft. When epoxy resins are cured with these adducts, they are much less resistant when exposed to solvents, acids bases and also to abrasion.

It should be understood however, our adducts contain fewer functional anhydride groups per unit weight of product. Hence a somewhat higher weight of adduct is necessary to cure or cross-link epoxy resins.

For a fuller understanding of the nature and objects of the invention, reference may be had to the following examples which are given merely as further illustrations of the invention and should not be construed in a limiting sense.

The first example is directed to the preparation of an aromatic based glycol.

Example I (A) *Preparation of the bis-phenols.*—7.97 parts by weight of trioxane were added to 91.15 parts by weight of p-tertiary octyl phenol and the resulting mixture heated to 55° C. until the phenol melted. The tertiary octyl substitutent was derived from diisobutylene and has the structure

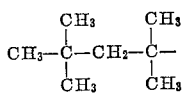

Diisobutylene is primarily a mixture of 2,4,4-trimethyl-pentene-1 and 2,4,4-trimethylpentene-2. 0.88 part by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass which was a pinkish-white viscous material was neutralized with 0.96 parts by weight of a 50% by weight aqueous potassium carbonate solution and agitated for an additional half hour. The mass was then brought up to a temperature of 150° C. while under a nitrogen atmoshpere and this temperature was maintained for 2 hours. The product, which was essentially a bis-phenol was a pinkish, tacky resin having a total alkali content of 0.05%.

(B) *Preparation of the bis-phenol ethylene oxide condensate.*—96.8 parts by weight of ethylene oxide were slowly added to 424 parts by weight of the bis-phenol of part (A) in the presence of 0.4 part by weight of potassium carbonate as catalyst which was dispersed in the bis-phenol. The temperature was maintained at 170° C. during the ethylene oxide addition. The resulting condensate which was the aromatic based glycol was purged with nitrogen. It was a clear amber, tacky resin at room temperature.

Example II 52.1 grams (0.1 mol) of bis-(2-β-hydroxyethyl-5-tert-octyl-phenyl) methane, 43.6 grams (0.2 mol) of pyromellitic dianhydride and 95.7 grams of methyl ethyl ketone were refluxed for about 5 hours yielding a clear amber colored solution. This solution contained 50.0% by weight of solids. Removal of the solvent yielded a tan brittle solid melting at 135° to 140° C., (Durran's Mercury Method) and containing 15.0% by weight of anhydride groups and 9.4% by weight of carboxyl groups. The molecular weight of the product was 966.

Example III 54.9 grams (0.1 mol) of bis-(2-β-hydroxyethyl-3-methyl-5-tert-octyl-phenyl) methane and 43.6 grams (0.2 mol) of pyromellitic dianhydride in 98.5 grams of methyl ethyl ketone were reacted in the same manner as shown in Example II to yield a tan brittle solid melting at 100° to 105° C., and containing 14.6% by weight of anhydride groups and 9.1% by weight of carboxyl groups. The molecular weight of the product was 994.

The products of Examples II and III were found to be soluble to an extent greater than 25 grams per 100 grams of solvent at 25° C., in acetone, methyl ethyl ketone, ethyl acetate, ethylene glycol mono-ethyl ether acetate and 2-nitro-propane. These products were also found to be soluble to an extent of about 10 grams per 100 grams of solvent in xylene, methyl iso-butyl ketone and ethylene dichloride.

Example IV 62 grams (.12 mol) of bis-(2-β-hydroxyethyl-5-octyl-phenyl) methane and 43.6 grams (0.2 mol) of pyromellitic dianhydride were refluxed together in 105.6 grams of methyl isobutyl ketone for about four hours. This solution contained about 6.5 percent by weight of anhydride groups and no free hydroxyl groups. Removal of the solvent yielded a light tan colored solid containing 13.0 percent by weight of anhydride groups having a melting point range of about 110° to 125° C. The molecular weight of the product was 1056.

Solubility of the product of Example IV was greater than 40 grams per 100 grams solvent in xylene, aliphatic ketones, nitroparaffins, chlorinated hydrocarbons and aliphatic esters.

Examples of epoxy resins which can be formulated with our pyromellitic dianhydride condensates can be found in United States Patent No. 2,615,008, Greenlee, October 21, 1952; United States Patent No. 2,682,515, Naps, June 29, 1954; United States Patent No. 2,564,194, De Nie et al., August 14, 1951; and United States Patent No. 2,590,059, Winkler, March 18, 1952. It is of course understood that these are merely exemplary and not limiting. The resulting compositions are useful as coating compositions. The preparation and properties of several typical epoxy resins (glycidyl polyethers) taken from several of the above patents are described below in Examples V to VII. The parts and percentages are by weight.

Example V 798 parts of bis-phenol were dissolved in a caustic soda solution made by dissolving 200 parts of caustic soda in 1730 parts of water in a stainless steel kettle, and 650 parts of epichlorohydrin were added to the closed kettle. The mol ratio of epichlorohydrin to bis-phenol was 2 to 1. The kettle was provided with a stirrer and the mixture was stirred during the process. The temperature rose from around 37° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

The softening point of the above resinous product determined by Durran's Mercury Method was 43° C. The approximate molecular weight determined by a standard boiling point elevation method was about 451. The determination of the epoxide groups in the product showed an equivalent weight of 325 per epoxide group which would represent approximately 1.39 epoxy groups per molecule of the average molecular weight indicated, and an equivalent weight to esterification of 84.5.

The above resin was further reacted by adding 57 parts of bis-phenol and 0.055 part of sodium hydroxide to 325 parts of resin, corresponding to an equivalent of about 0.5 phenolic hydroxyl per epoxide group, sufficient to react with only about one-half of the epoxide groups of the resin, and this mixture was heated for 90 minutes at 150° C. and gave a product having a softening point of 74° C. and an equivalent weight to epoxide of 532.

Example VI

In a vessel fitted with an agitator, 228 parts of 2,2-bis(4-hydroxyphenyl) propane and 55 parts of sodium hydroxide as a 10% aqueous solution are introduced and heated to about 45° C. whereupon 113 parts of epichlorohydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. the resulting solid glycidyl polyether has the following properties:

| | |
|---|---|
| Durran's melting point, ° C. | 98 |
| Molecular weight | 1400 |
| Epoxide value (equivalents epoxide per 100 grams) | 0.12 |
| Epoxide equivalent weight | 834 |
| Hydroxyl value (equivalents hydroxyl per 100 grams) | 0.348 |
| Percent chlorine | 0.14 |

1,2-epoxy equivalency is 1.68.

To 100 parts of the above polyether heated to about 150° C. there are added 5 parts of 2,2-bis(4-hydroxyphenyl) propane. The heating is continued for about 2 hours while stirring and gradually increasing the temperature to 200° C. The resulting solid product has the following properties:

| | |
|---|---|
| Durran's melting point, ° C. | 122 |
| Molecular weight | 2900 |
| Epoxide value (equivalents epoxide per 100 grams) | 0.06 |
| Epoxide equivalent weight | 1670 |
| Hydroxyl value (equivalents hydroxyl per 100 grams) | 0.37 |
| Percent chlorine | 0.13 |

1,2-epoxy equivalency is 1.7.

*Example VII*

A solution is prepared by dissolving 2,2-bis(4-hydroxyphenyl)-propane in slightly aqueous epichlorohydrin in the proportion of 5130 parts (22.5 mols) of the dihydric phenol in 20,812 parts (225 mols) of epichlorohydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bisphenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorohydrin and water, but the temperature is not allowed to go below about 95° C. No cooling is necessary after the final addition of sodium hydroxide. After the last addition of sodium hydroxide with completion of the reaction, the excess epichlorohydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis(4-hydroxyphenyl)-propane has the following properties:

| | |
|---|---|
| Durran's melting point, ° C. | 9 |
| Molecular weight | 370 |
| Epoxide value (epoxide equivalents per 100 grams) | 0.50 |
| Epoxide equivalent weight | 200 |
| Hydroxyl value (hydroxyl equivalents per 100 grams) | 0.08 |
| Percent chlorine | 0.46 |

The following examples demonstrate the use of our adducts in the preparation and application of coating compositions.

*Example VIII*

The following ingredients were utilized in preparing a coating formulation:

| | Grams |
|---|---|
| Pyromellitic dianhydride adduct prepared in Example II | 85.5 |
| Epoxy resin prepared in Example V [1] | 154.0 |
| Epoxy resin prepared in Example VI [2] | 23.0 |
| Ethylene glycol mono-ethyl ether acetate ("Cellosolve" acetate) | 168.0 |
| Toluene | 120.0 |
| Methyl ethyl ketone | 100.0 |
| Xylene | 105.0 |
| Polyol X–450 [3] | 20 |

[1] Prepared by following procedure set forth in both paragraphs of Ex. V.
[2] Prepared by following procedure set forth in both paragraphs of Ex. VI.
[3] This ingredient, though not essential for film properties, was added as a flow control agent. It is a styrene alkyl alcohol polymer manufactured by Shell Chemical Co.

The pyromellitic dianhydride adduct of Example II was dissolved in the methyl ethyl ketone. The two epoxy resins were dissolved in the ethylene glycol mono-ethyl ether acetate and then diluted with the toluene and xylene. The two solutions were then combined and mixed and the flow control agent stirred in thus forming the coating formulation.

Coatings were prepared by first spraying the coating formulation prepared above to a dry film thickness of about 1 mil on "Bonderite 100" steel panels. The sprayed panels were dried for 15 minutes and then baked at 300° F. for 30 minutes.

The following sets forth the excellent physical and chemical properties of the resulting coating prepared above. The coated panels were tested as indicated below. These tests are all well known tests utilized by the coatings industry.

A. *Physical properties—*
Flexibility—passed ⅛ inch mandrel
Impact (in./lb.)—100
Color retention—good
Specular gloss, 60°—>100
Adhesion—passed "Scotch" tape test
Pencil hardness—4H to 8H B. *Chemical resistance.*—Coated panels prepared as indicated above were immersed in the liquid media set forth below for the indicated times and temperatures. The effects upon the coating were observed and recorded below.

| Liquid media: | Effect upon the coating |
|---|---|
| Boiling water for 24 hours | No effect. |
| Cold water for 5 months | Do. |
| Boiling methyl ethyl ketone for 24 hours | Do. |
| Cold methyl ethyl ketone for 5 months | Do. |
| 3% by weight aqueous solution of NaOH for 5 months | Do. |
| Glacial acetic acid for ½ month | Do. |
| 10% sulfuric acid solution @ 125° F. for 5 months | Do. |

In the following example, pyromellitic dianhydride was used in the preparation of a coating formulation in place of the pyromellitic anhydride adduct used in the preceding example.

*Example IX*

The following ingredients were utilized in preparing a coating formulation.

|  | Grams |
|---|---|
| Pyromellitic dianhydride | 117.7 [1] |
| Epoxy resin of Example V [2] | 154 |
| Epoxy resin of Example VI [3] | 23 |
| Ethylene glycol mono-ethyl ether acetate | 168 |
| Toluene | 120 |
| Methyl ethyl ketone | 100 |
| Xylene | 105 |

[1] This amount was equivalent to 85.5 grams of the adduct of Ex. II.
[2] Prepared by following the procedure set forth in both paragraphs of Ex. V.
[3] Prepared by following the procedure set forth in both paragraphs of Ex. VI.

The pyromellitic dianhydride would not dissolve in the methyl ethyl ketone. Hence it was suspended therein and the suspension added to a solution of the epoxy resins in the other solvents. Despite thorough mixing, standing overnight and heating at 50° C. for one hour, the pyromellitic dianhydride could not be dissolved. It settled out to the bottom of the vessel and when shaken gave an opaque suspension which was unsatisfactory for dipping, brushing or spraying. The presence of a flow control agent did not help to clarify this mixture, i.e., when 40 grams of Polyol X–450 were added, the mixture remained opaque and heterogeneous.

Two additional samples of the above mixture were prepared, except for the Polyol X–450. 40 grams of Resimene 882 was added to one and 40 grams of Uformite F–240 to the other. These flow control additives did not clarify the systems and they could not be made into useful uniform coating formulations.

Resimene 882 is a melamine formaldehyde resin manufactured by Monsanto Chemical Company. Uformite F–240 is a urea formaldehyde resin manufactured by Rohm and Haas.

Thus it can be seen that free pyromellitic dianhydride cannot be successfully used in the preparation of uniform coating formulations since the free pyromellitic dianhydride cannot be readily dissolved in common solvents.

The following example is directed to the preparation of a coating formulation which contains our novel condensate. In this example, the coating formulation is utilized in a fluidized bed application.

*Example X*

The following ingredients were utilized to prepare the coating formulation:

|  | Parts by weight |
|---|---|
| PMDA adduct of Example II | 36.0 |
| Epoxy resin of Example V [1] | 25.0 |
| Epoxy resin of Example VI [2] | 25.0 |
| Epoxy resin of Example VII | 4.0 |
| Titanium dioxide | 1.5 |
| Polyvinyl butyral [3] | 1.0 |
| Silica areogel [4] | 1.0 |

[1] Prepared by following the procedure set forth in both paragraphs of Ex. V.
[2] Prepared by following the procedure set forth in both paragraphs of Ex. VI.
[3] A polyvinyl butyral resin which is obtained by reacting a long chain polyvinyl alcohol with butyraldehyde to a residual alcohol content of about 18 percent (Butvar B–76).
[4] A very fine silica—about 99.8 percent purity.

The fluidized bed coating was prepared as follows. A dry finely ground mixture of the above components was prepared. The particles had a particle size of 50–325 mesh. The mixture was maintained as a fluidized bed. Then, metallic objects preheated to 325° F. were coated by immersing them into the fluidized bed. After withdrawal, the coated objects were heated at 300° F. for 30 minutes.

The following tests demonstrate the excellent chemical resistance of objects coated with epoxy resin coating formulations which contain our novel condensates. The coated objects were immersed under the conditions described below and the effects upon the coating were observed and recorded below.

| Liquid media: | Effect upon the coating |
|---|---|
| 15% HCl solution at 75° F. 1 month | No effect |
| 5% sulfuric acid solution at 75° F. for 1 month | Do. |
| Water at 75° F. for 1 month | Do. |
| Water at 140° F. for 1 month | Do. |
| Xylene at 75° F. for 1 month | Do. |
| Mineral spirits at 75° F. for 1 month | Do. |
| 20% by weight aqueous solution of NaOH, at room temperature | Slightly softened. |
| Carbon tetrachloride at room temperature for 1 month | Do. |

As the foregoing has shown, we have discovered novel pyromellitic dianhydride condensates which, for many applications especially in the curing of epoxy resins, enable one to derive the benefits from pyromellitic dianhydride without having present its disadvantages.

The outstanding properties attributed to our condensates, as has been shown, are in part due to the selection and use of the disclosed class of aromatic glycols.

Having described our invention, what we claim as new and desire to secure by Letters Patent is:

1. The compound of the formula

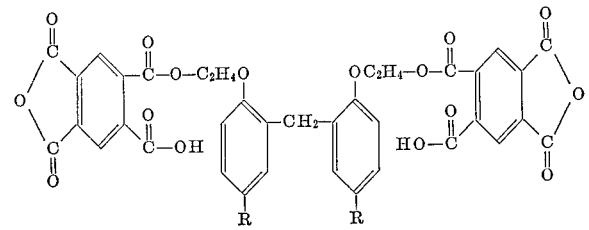

wherein R is octyl.

2. A composition of matter comprising an adduct of pyromellitic dianhydride, said pyromellitic dianhydride adduct being the reaction product of pyromellitic dianhydride and an aromatic based glycol having the following structure:

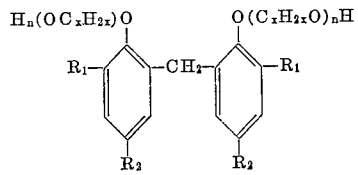

wherein $R_1$ is selected from the group consisting of hydrogen and methyl; $R_2$ is selected from the group consisting of straight chain, branched chain and carbocyclic alkyl substitutents having from about 5 to 12 carbon atoms; $n$ is an average number varying from 1 to 3 and $x$ is a whole number varying from 2 to 4, the mol ratio of pyromellitic dianhydride and said aromatic based glycol being from just in excess of 1.0 to 1.2 mols of said aromatic based glycol for each 2 mols of pyromellitic dianhydride.

3. The composition of claim 2 in which $x$ is 2, $n$ is one, $R_1$ is hydrogen and $R_2$ is octyl.

4. The composition of claim 2 in which $x$ is 2, $n$ is one, $R_1$ is hydrogen and $R_2$ is nonyl.

5. The composition of claim 2 in which $x$ is 2, $n$ is one, $R_1$ is methyl and $R_2$ is octyl.

6. The compositon of the formula

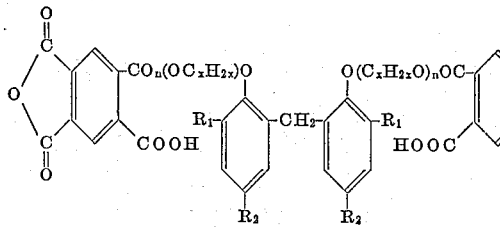

wherein $R_1$ is selected from the group consisting of hydrogen and methyl; $R_2$ is selected from the group consisting of straight chain, branched chain and carbocyclic alkyl substitutents having from about 5 to 12 carbon atoms; $n$ is an average number varying from 1 to 3 and $x$ is a whole number varying from 2 to 4.

7. The composition of the formula

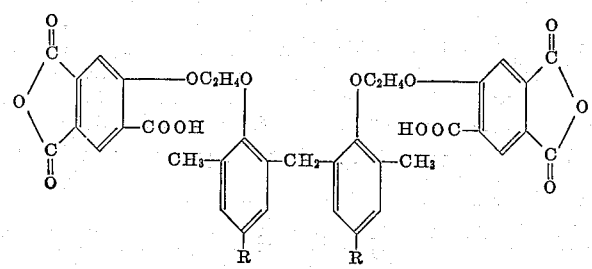

where R is octyl.

References Cited by the Examiner
UNITED STATES PATENTS 2,908,664 10/1959 Belanger et al. _____ 260—2
2,947,717 8/1960 Belanger et al. _____ 260—47

IRVING MARCUS, *Primary Examiner.*

H. J. LIDOFF, WALTER A. MODANCE, NICHOLAS S. RIZZO, *Examiners.*

UNITED STATES PATENT OFFICE
CERTIFICATE OF CORRECTION

Patent No. 3,239,537              March 8, 1966

Robert Steckler et al.

It is hereby certified that error appears in the above numbered patent requiring correction and that the said Letters Patent should read as corrected below.

Column 1, line 11, for "posses" read -- possess --; column 2, lines 3 to 9, for that portion of the formula reading "$N_n(OC_xH_{2x})O$" read -- $H_n(OC_xH_{2x})O$ --; column 5, line 5, for "bis-phenols" read -- bis-phenol --; line 27, for "atmoshpere" read -- atmosphere --; column 9, line 57, for "areogel" read -- aerogel --; column 10, line 6, after "75° F." insert -- for --; line 45, for "compositon" read -- composition --.

Signed and sealed this 17th day of December 1968.

(SEAL)

Attest:

Edward M. Fletcher, Jr.
Attesting Officer

EDWARD J. BRENNER
Commissioner of Patents